United States Patent [19]

Bauer et al.

[11] Patent Number: 5,052,740
[45] Date of Patent: Oct. 1, 1991

[54] FOLDING TOP FOR VEHICLES

[75] Inventors: Theodor Bauer, Altenriet; Jürgen Schrader, Stuttgart, both of Fed. Rep. of Germany

[73] Assignee: Mercedes-Benz AG, Stuttgart, Fed. Rep. of Germany

[21] Appl. No.: 404,191

[22] Filed: Sep. 7, 1989

[30] Foreign Application Priority Data

Sep. 7, 1988 [DE] Fed. Rep. of Germany ....... 3830393

[51] Int. Cl.⁵ .............................................. B60J 7/85
[52] U.S. Cl. .................................. 296/120.1; 296/121; 296/122
[58] Field of Search ...................... 296/107, 117, 120.1, 296/121, 122

[56] References Cited

U.S. PATENT DOCUMENTS

| 2,602,692 | 7/1952 | Urquhart | 296/117 |
| 2,715,545 | 8/1955 | Orr | 296/117 |
| 3,994,524 | 11/1976 | Lehmann | 296/107 |

FOREIGN PATENT DOCUMENTS 3724531 12/1988 Fed. Rep. of Germany ...... 296/121

Primary Examiner—Dennis H. Pedder
Attorney, Agent, or Firm—Evenson, Wands, Edwards, Lenahan & McKeown

[57] ABSTRACT

A folding top for vehicles has a common pivoting drive of a main strut and of a roof-skin retaining bow via mechanical drive members, by means of which pivoting drive of the folding top can be transferred from a stowed position retracted into a top box into a closed position, in which the roof-skin retaining bow rests on the top-box lid located in a covering position thereof. An automatically controlled lock of the main strut relative to the vehicle body in its erected end position is provided and associated with its uncoupling from the driving movement of the drive members. For locking the main strut fixedly to the vehicle body, there are catch devices which are assigned to the top columns and the catching advance of the which starts only after the erected end position of the main strut has already been reached, and the uncoupling from the driving movement of the drive members is activated via the catching advance of the catch means only when the main strut has been locked.

16 Claims, 12 Drawing Sheets

FOLDING TOP FOR VEHICLES

BACKGROUND AND SUMMARY OF THE INVENTION

The present invention generally relates to a folding top for vehicles and more particularly to a mechanical drive arrangement for opening and closing the folding top.

A folding top of the type concerned here is disclosed by German Patent Specification 3,724,531 in which the folding top is open and closed alternately, via a pivoting drive of mechanical drive members, without particular knowledge of the folding sequence of the main strut and roof-skin retaining bow. At the same time, all the movement controls in the two lever mechanisms take place purely mechanically, thus per se guaranteeing a high operating liability.

To make it possible to lock the main strut in an erected end position thereof and at the same time uncouple the main strut from the driving movement of drive cylinders, a control pawl is mounted pivotably on a bracket side of the main strut. The control pawl fork of the control pawl has a crosspin connected fixedly to an associated top column which penetrates on both sides thereof during the operation of erecting the mains strut. In the final phase of its erecting movement, the control pawl is thereby swung nearer to the bottom of the bracket, as a result of which the main strut is locked in the manner of a rotary latch.

During the pivoting movement of the control pawl, a detent member, running in a radially extending linear guide of the drive member, is simultaneously shifted into its release position, with the result that the main strut is uncoupled from the driving movement of the drive members. Thus, during the further pivoting of the drive members in the same direction, now only the roof-skin retaining bow is driven, whereas the drive members no longer provide support for the erected main strut. Because of this arrangement of control by control pawls, the operation of uncoupling the main strut is superposed on the operation of locking it, and as a result there is no guarantee that the locking of the top columns to the vehicle body is concluded before the uncoupling operation between the top columns and the associated drive member has ended.

This problem is aggravated particularly because, during the closing of the folding top, for example as a result of wind forces captured in the top material, the main strut is loaded counter to its swing-up direction.

However, a further pivoting of the mechanical drive members when the main strut is not completely locked must necessarily lead to operating faults in the actuation of the top, and these can nullify again the advantage afforded per se by an automatic sequence control of the movement of the rod assembly.

An object of the present invention is, therefore, to provide a folding top of the relevant generic type, wherein an uncoupling of a main strut from the driving movement of drive members begins only after the main strut has been locked in its erected end position.

This and other objects are achieved by an arrangement having a purely mechanical mode of operation. Different types of catch means are possible, in principle, for this. It is necessary to guarantee, however, that the main strut is blocked in pivoting terms via catch devices as early as during a first phase of a catching advance, after which uncoupling of the main strut from the drive members can be activated in the course of subsequent catching advance.

Other objects, advantages and novel features of the present invention will become apparent from the following detailed description of the invention when considered in conjunction with the accompanying drawings.

DETAILED DESCRIPTION OF THE DRAWINGS

Figure 1:
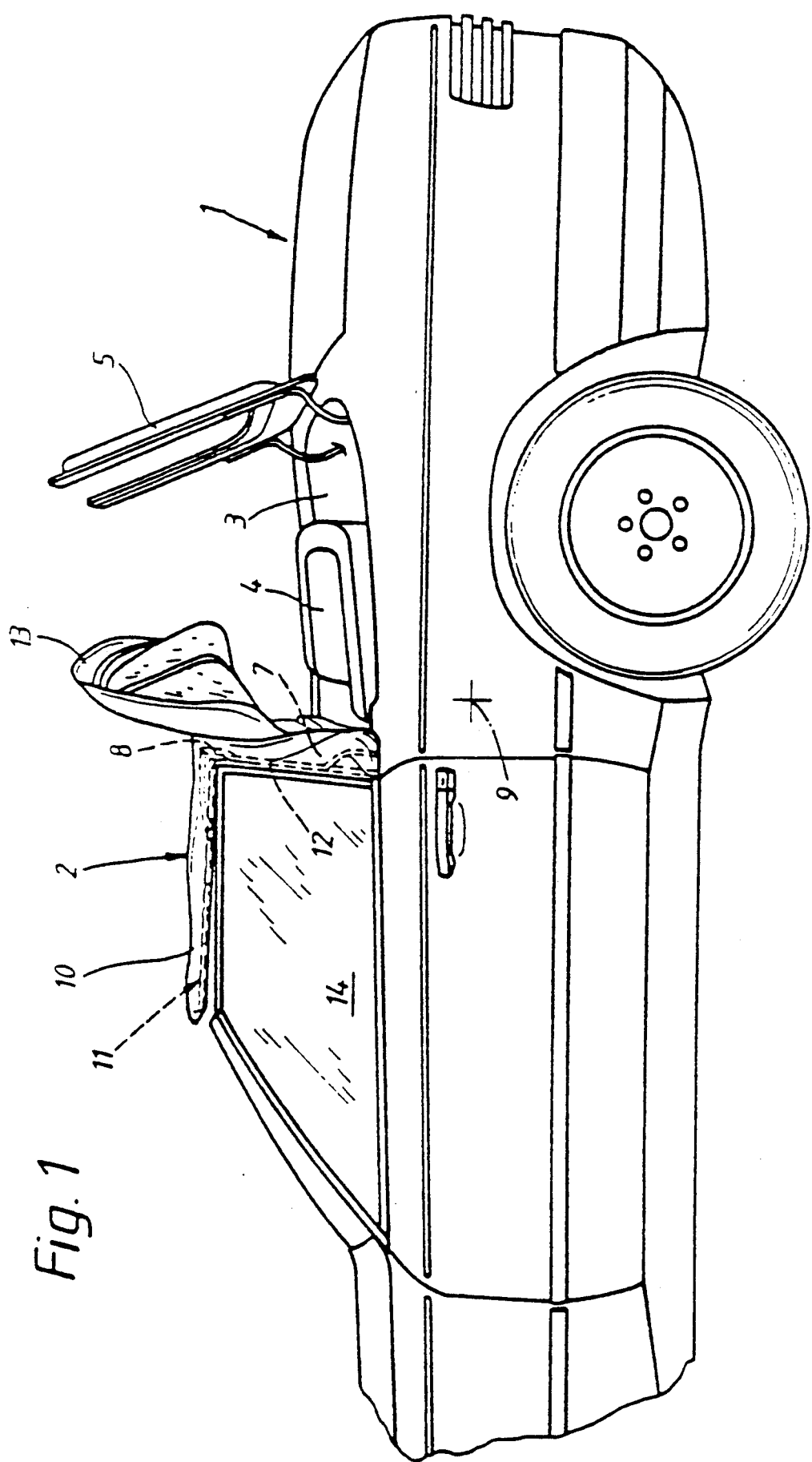
FIG. 1 shows a perspective side view of a convertible with the top-box lid open.
Figure 1A:
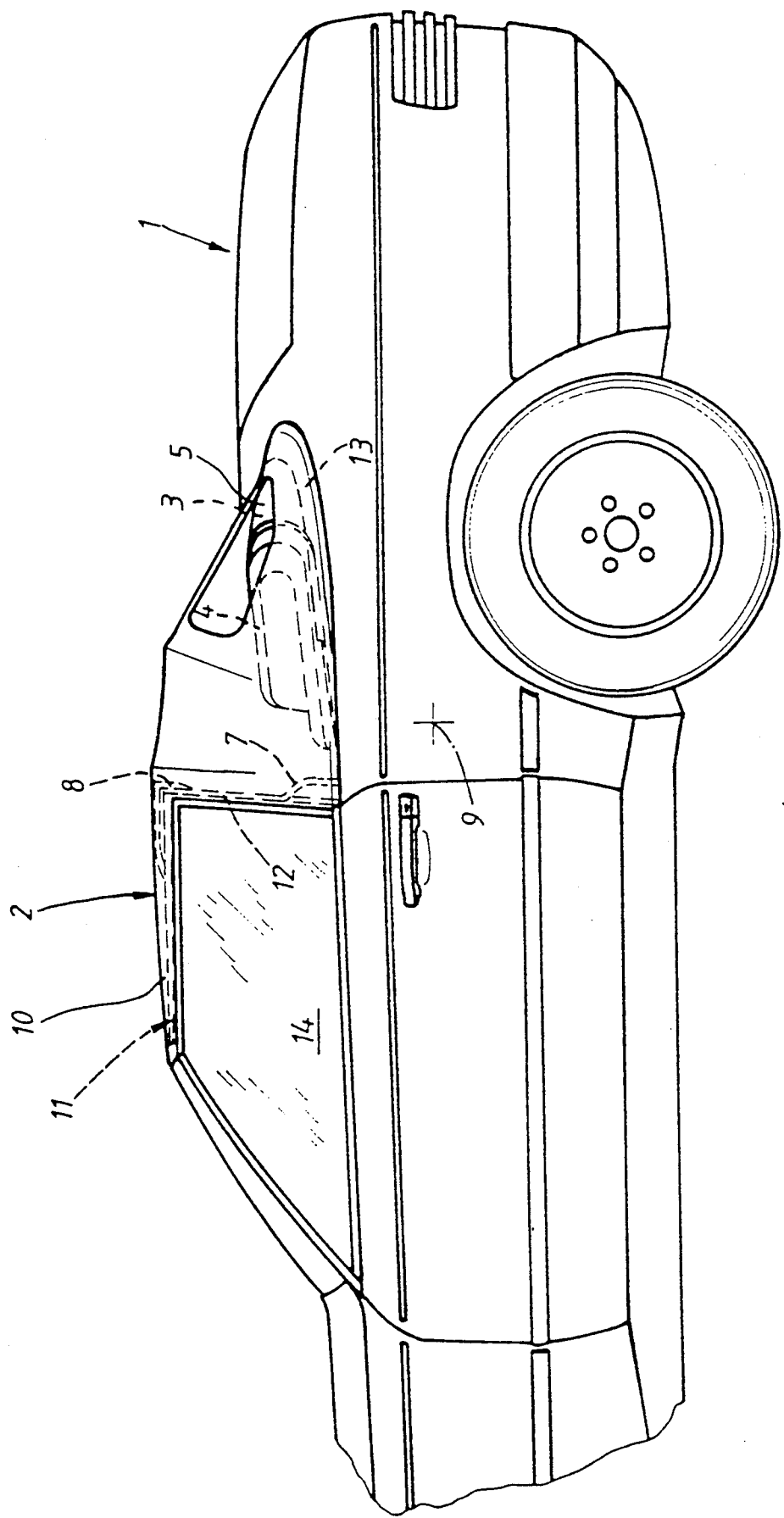
FIG. 1A is a perspective side view similar to FIG. 1 but with the top box lid closed and the roof-skin retaining bow resting on the lid.

FIG. 1 illustrates a side view of a motor vehicle 1 with a folding top 2 which can be swung alternately from an unfolded covering position, in which the roof is completely closed, into a stowed position retracted completely into an associated top box 3. The top box 3 surrounds a back-seat region 4 at the rear and laterally and therefore has a U-shaped design. The top box 3 is provided with a fold in orifice, which can be covered by a matching top-box lid 5. For this purpose, the top-box lid 5 is pivotable about a transverse axis not visible and extending behind the top box 3 and is lockable in a closing position on the top box 3.

Forward-pointing lateral legs of the top box 3 merge into brackets 6 which are arranged recessed in the body of the motor vehicle 1 on both sides of the latter and which are partially visible in the individual illustrations. A supporting top rod assembly together with lateral top columns 7 of a main strut 8 are mounted on the two brackets 6 of mirror-imaged design pivotably about a main axis 9, the axial direction of which is exactly perpendicular relative to the longitudinal mid-plane of the motor vehicle 11.

The top rod assembly is covered with a flexible roof-skin 10 made of, for example, textile material, which, with the folding top 2 closed, is held tautly by front roof-frame parts 11, lateral cloth-holding rails 12 and a roof-skin retaining bow 13 forming a rear termination of the folding top 2. The front roof-frame parts 11 are positively controlled mechanically as a function of the pivoting angle of the main strut 8.

The cloth-holding rails 12, which extend adjacent to associated side window panes 14 and parallel to a rear pane edge, are fastened to the columns 7 of the main strut 8 in such a way that, as seen from the vehicle side, they participate in the pivoting movement of the main strut 8, assuming an approximately constant position in relation to the columns 7. Conventionally, the roof-skin retaining bow 13 forms as a whole the lower arcuate outer contour of the roof and is likewise articulated at its two ends on the brackets.

Figure 2:
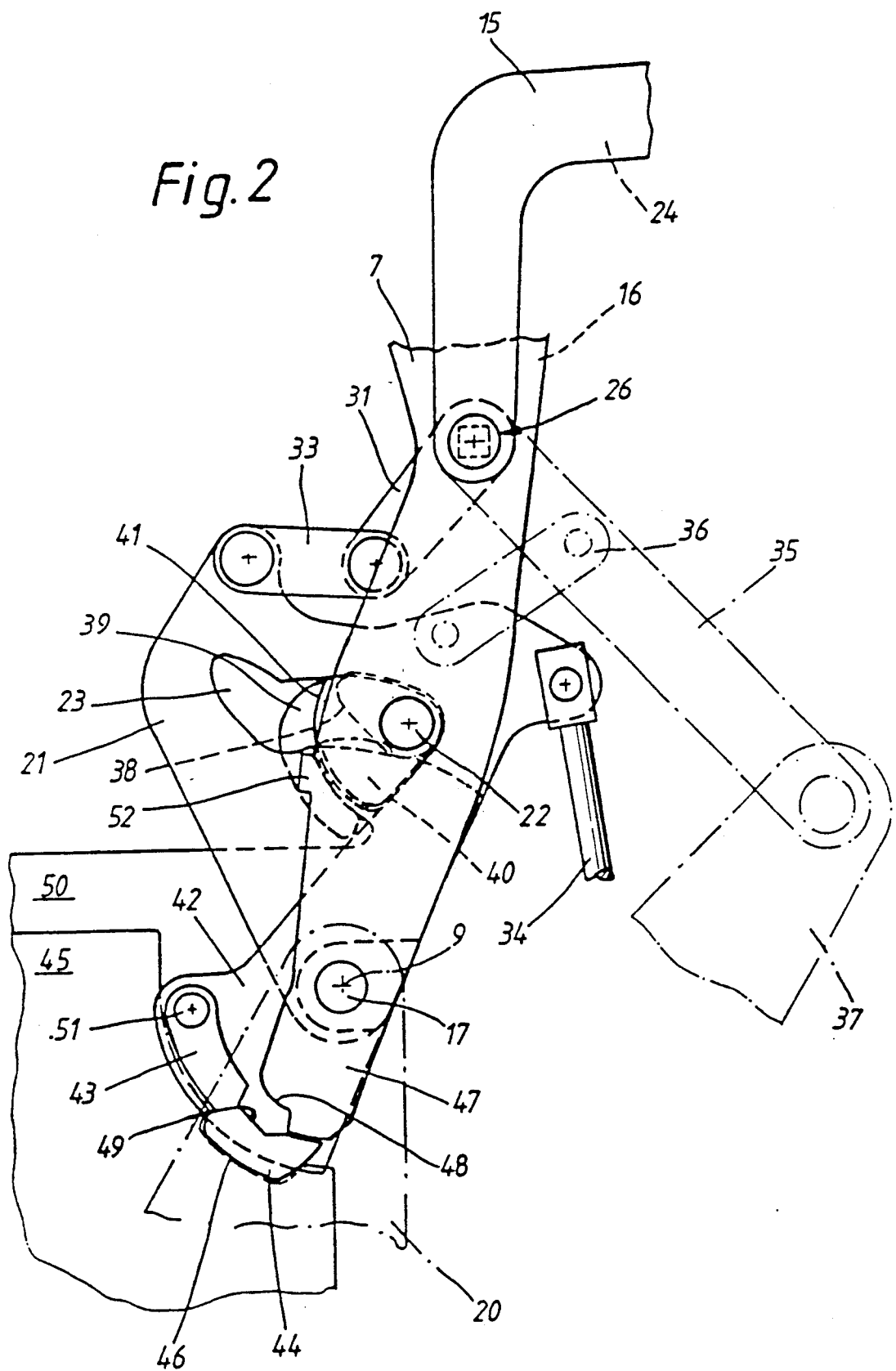
FIG. 2 shows a side view of a left-hand lever mechanism of the folding top of FIG. 1, with the top closed.

The conditions of articulation of the top columns 7 of the main strut 8 and of the roof-skin retaining bow 13 can be seen clearly in FIG. 2, and, of the roof-skin retaining bow 13, only the end of a bearing arm 15 angled at 90° out of a plane outlined by the roof-skin retaining bow 13 is visible. The top column 7 is made fork-shaped at a lower end portion thereof in order to increase the lateral bending strength. For this purpose, an auxiliary section 16, having a cross-section which corresponds to the rectangular cross-section of the top column 7, is rigidly connected by means of a broad side thereof at a considerable distance from the lower end of the top column 7, for example by welding, to the opposite broad side of the top column 7.

Figure 3:
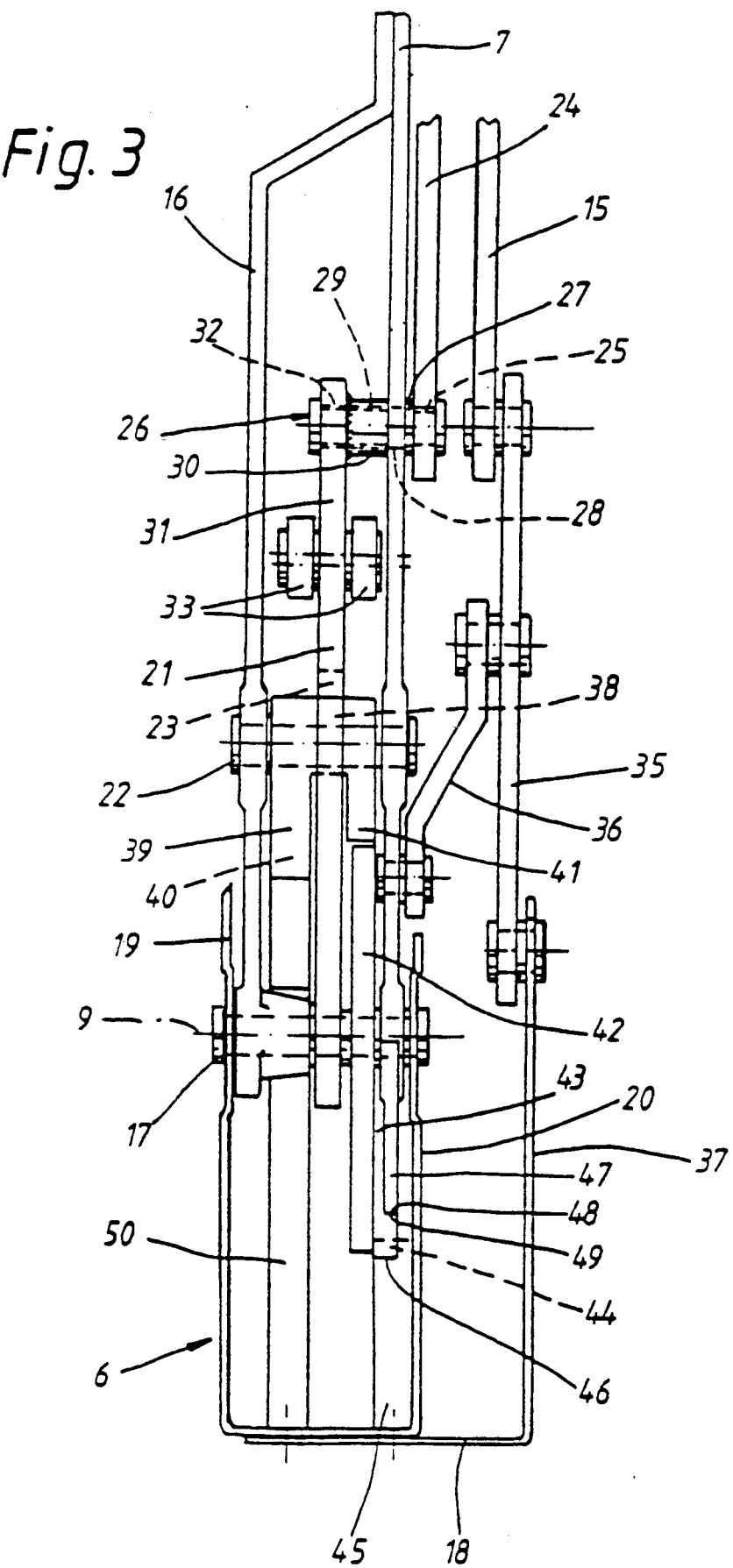
FIG. 3 shows a front view of the lever mechanism according to FIG. 2.
Figure 4:
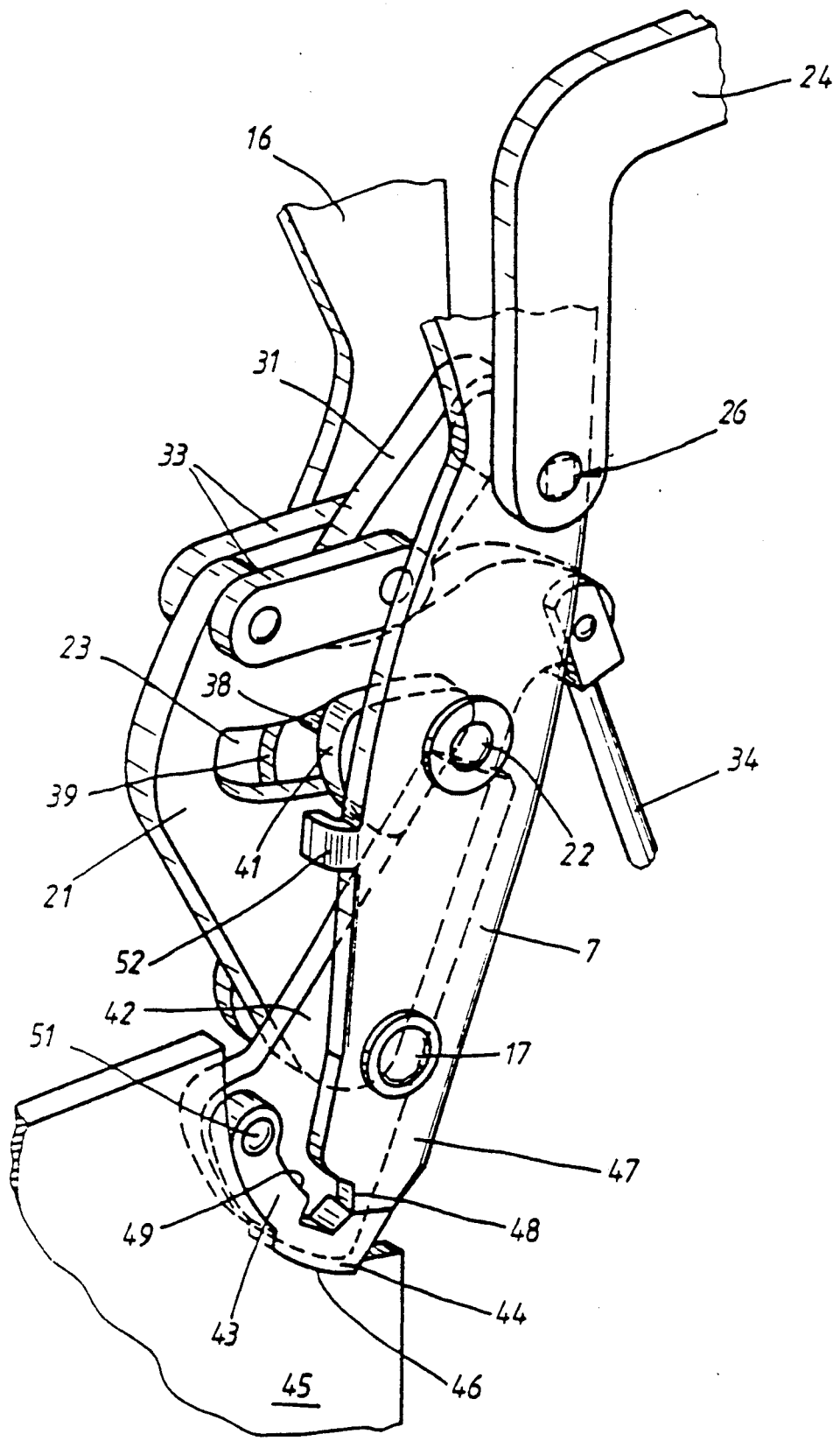
FIG. 4 shows a perspective side view of the lever mechanism according to FIG. 2 in a partial representation.
Figure 5:
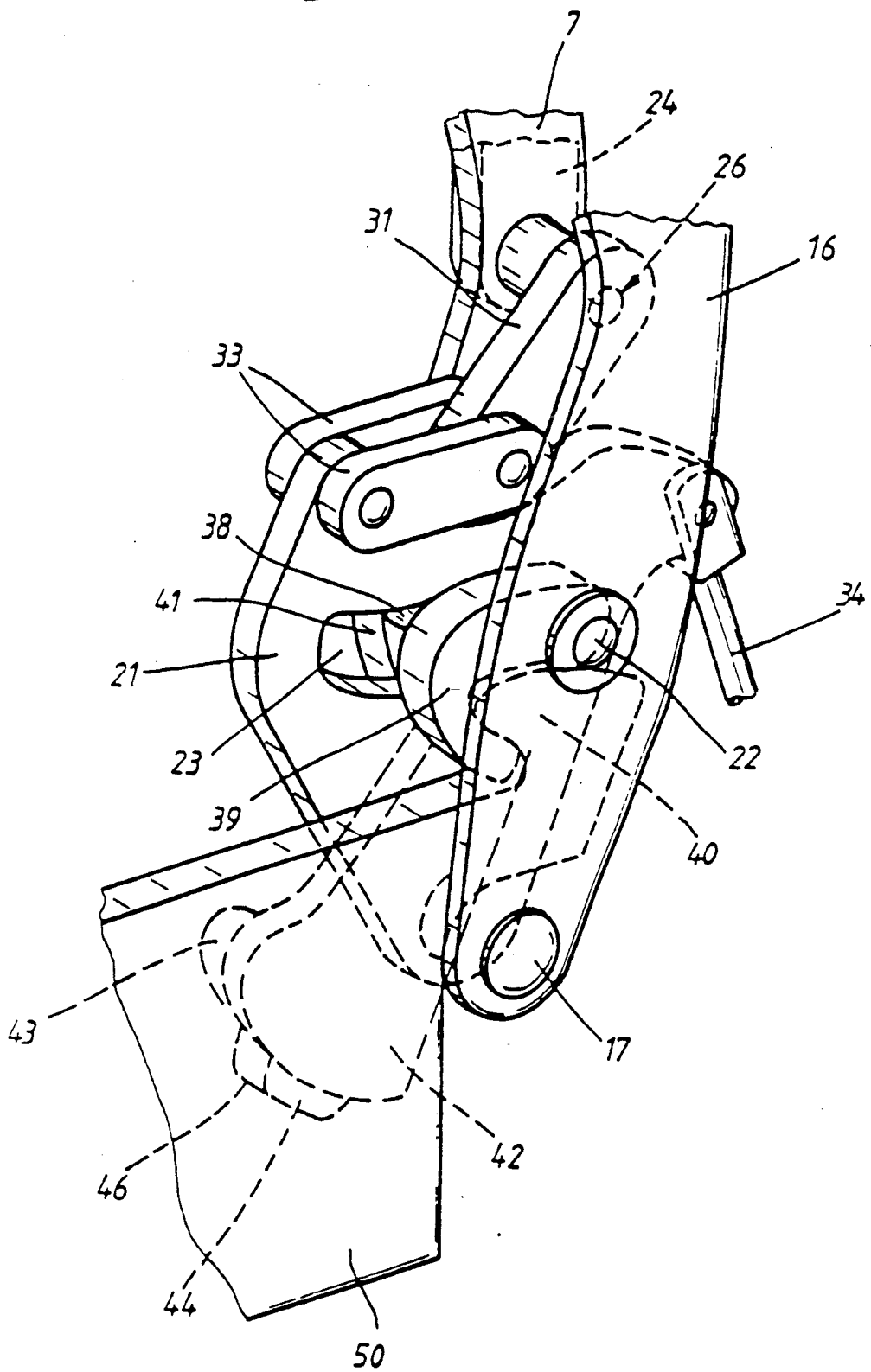
FIG. 5 shows a perspective side view of the right-hand lever mechanism in a partial representation corresponding to that of FIG. 4.

As can be seen in conjunction with FIG. 3, after this rigid connecting zone, the auxiliary section 16 extends obliquely away from the top column 7 and, after a necessary width spacing has been obtained, merges into a direction of extension parallel to the top column 7. The lower ends of the top column 7 and of the auxiliary section 16 have a common axle pin 17, on which the top column 7 and the auxiliary section 16 are jointly mounted. The axle pin 17 is arranged in the lower end region of the brackets 6, and it passes through a bearing flange 19, projecting vertically upwards from a baseplate 18, and through an intermediate web 20 projecting parallel to the bearing flange 19 and is secured in this intermediate web 20.

The axial direction of the axle pin 17 defines the main axis 9 of the folding top 2. Between the mutually opposite broad sides of the top column 7 and of the auxiliary section 16, a mechanical drive member 21 is centrally mounted rotatably on the axle pin 17. On a bearing side, the drive member 21, although being supported axially between the top column 7 and the auxiliary section 16, is nevertheless rotatably mounted independently of the main strut 8. Moreover, it has a material thickness which is markedly less than the clear distance between the column 7 and the auxiliary section 16.

Approximately at half the height of the length of the auxiliary section 16 extending parallel to the top column 7, there passes through the broad sides of the top column 7 and of the auxiliary section 16, a carrier bolt 22 which extends perpendicularly relative to their breadth planes. The carrier bolt 22 has a round cross-section and at the ends is connected rigidly to the top column 7 and the auxiliary section 16. At the same time, it passes with circumferential play through a slot 23 which is cut out from the drive member 21. At a distance from the drive member 21 in terms of height is a lever 24 articulated on the top column 7 on the outside of the latter. The pivoting plane of the lever 24 is parallel to the pivoting plane of the top column 7. The lever 24 is slipped at an end onto a square journal 5 of a bearing shaft 26 and is riveted to it, thus making a rotationally fixed connection.

The square journal 25 merges into a stop collar 27 which on one end face rests against the lever 24 and which is supported by means of its opposite end face on the confronting broad side of the top column 7. Adjoining the stop collar 27 is a round-bolt portion 28 which is stepped relative to the stop collar 27. The round-bolt portion 28 is rotatably mounted with an exact fit in a matching transverse bore of the top column 7, the length of the round-bolt portion 28 being matched to the thickness of the top column 7.

After the round-bolt portion 28, the bearing shaft 26 merges once again into a square portion 29 which extends approximately over half the distance between the top column 7 and the auxiliary section 16. First a spacer sleeve 30 and then an additional lever 31 with an inner square 32 coordinated with the square portion 29 are pushed onto the latter and secured in the pushed-on state by an axial retention means.

The pushed-on additional lever 31 extends in an opposite direction to the lever 24 and is connected to the lever 24 fixedly in terms of rotation via bearing shaft 26. The length of spacer sleeve 30, which can be connected firmly to the additional lever 31, is calculated so that the additional lever 31 lies in a common pivoting surface plane with the drive member 21. Connected to the downward-directed end of the additional lever 31 is a rear end of an intermediate link 33 which extends approximately horizontally forwards next to the pivoting plane of the additional lever 31.

The front end of the intermediate link 33 is fastened to a front corner point of the drive member 21 which has a basic form resembling that of a segment of a circle and which is mounted in the region of its vertex point on the axle pin 17. A front corner point of the drive member 21 engages, in an articulated manner, a piston rod 34 of a hydraulic cylinder (not shown), the opposite end of which is connected likewise in an articulated manner to a rotary bearing fixed to the vehicle body. The hydraulic cylinder is connected in a known way, via hydraulic hoses, to a hydraulic pump which can be activated electrically. The pump connected to the two hydraulic cylinders is reversible for the purpose of reversing the direction in which the pistons are subjected to pressure in the working cylinders.

The drive member 21 is therefore pivotable about the main axis 9 in an anti-clockwise direction during extension of the associated piston rod 34 out of the working cylinder and in a clockwise direction during retraction of the piston rod 34.

As long as there is a driving connection between the top column 7 and the associated drive member 21, both the top column 7 and the lever 24 participate synchronously in the movement of the drive member 21. In contrast, if the driving connection is broken, the drive member 21 can move independently of the top column 7, thus resulting in an opposite relative movement of the lever 24 in relation to the drive member 21.

This relative movement arises because the drive pulse of the drive member 21 is transmitted, via the intermediate link 33, to the additional lever 31, of which an end remote from the intermediate link 33 is connected fixedly in terms of rotation to the lever 24 mounted on the top column 7 via the bearing shaft 26. The lever 24 is itself to be effective as a drive lever for the roof-skin retaining bow 13, via which only the pivoting pulse is transmitted to the associated side leg of the roof-skin retaining bow 13. For this purpose, an end of the lever 24 (not shown) engages an associated side leg of the roof-skin retaining bow 13 via a rotary sliding joint, and because of the constructive design of the rod mechanism it is possible to subject the roof-skin retaining bow 13 to a pivoting drive through an angle of 90° independently of the top column 7.

Over and above its pivoting drive, the roof-skin retaining bow 13 must additionally be supported on the vehicle body and be shifted forwards during its retracting movement into the top box 3. For this purpose, there is provided a further rod mechanism, represented by dot-and-dash lines, which comprises a link 35 and a connecting rod 36 as additional mechanism members. A lower end of the link 35 is fastened to a side plate 37 of the bracket 6. The side plate 37 extends at a lateral distance from the intermediate web 20 and parallel to the pivoting plane of the top column 7.

As seen from the side, the link 35 extends obliquely forwards and upwards and terminates next to the bearing shaft 26, where it is connected in an articulated manner to the lower end of the bearing arm 15. Approximately at half the length of the link 35, there engages on the latter the connecting rod 36, via which the link 35 is connected to the top column 7 in an articulated manner. The connecting rod 36 extends downwards approximately at right angles to the longitudinal orientation of the link 35 and is appropriately bent in order to bridge the lateral distance from the top column 7.

As a result of these conditions of articulation, in which the geometrical axes of all the rod elements involved run parallel to one another, the point of articulation of the bearing arm 15 is moved forwards and downwards along a circular path determined by the pivoting length of the link 35, when the main strut 8 is folded down. At the same time, it is supported by means of the levers 24 via its rotary sliding joint. During the erection of the main strut 8, there is correspondingly a reverse cycle of movement with an advancing movement of the roof-skin retaining bow 13 simultaneously in the upward and rearward directions, and both during the erection and during the folding down of the main strut 8 the lever 24, in a constant position in relation to the associated top column 7, participates in the pivoting movement of the latter.

This presupposes a lock for the lever 24 which must be maintained over the pivoting travel of the main strut 8 and which can be released as soon as the main strut 8 has reached its erected end position and is itself locked fixedly to the vehicle body. Only after the operation of locking the main strut 8 has been concluded will the roof-skin retaining bow 13, which is carried into an erected intermediate position because it is coupled to the main strut 8 in terms of movement, be pivoted back, driven by the drive members 21, into a position resting on the top-box lid 5 which has swung to in the meantime.

For this it is necessary to uncouple the drive members 21 from the associated top column 7 after the erected end position of the main strut 8 has been reached. Furthermore, it must be possible to make the driving connection between the drive members 21 and the top columns 7 once again, when the roof-skin retaining bow 13 is once more swung up into its erected intermediate position during the operation of retracting the folding top 2.

In order to obtain an automatic movement, locking and sequence control, a mechanically positively controlled locking mechanism is assigned in a mirror symmetrical arrangement to the two drive members 21. This locking mechanism comprises respectively the carrier bolt 22, the slot 23, a control slide 38 guided slidably in the slot 23, a catch hook 39 and retaining nose 40 interacting with the catch hook 39 and fixed to the bracket 6. In addition, for positive control there is a detent mechanism which takes effect as a result of the interaction of an eccentric cam 41 with a detent rod 42, with a detent pawl 43 having a detent nose 44 with a supporting flanged 45 fixed to the bracket, the supporting flange 45 being provided with a detent recess 46 matched to the detent nose 44. In addition, the detent pawl 43 is controlled in terms of movement via a control rod 47 which rests by means of a control cam 48 against a control edge 49 of the detent pawl 43.

Before the functions are discussed in detail, the shape and installed position of the above-mentioned components will first be explained.

The slot 23 consists of a long hole of differing extension in terms of breadth, the narrow sides limiting the slot 23 performing the function of guiding the control slide 38. Thus, as seen from the side, the upper narrow side of the slot 23 first extends forwards along a circular path about the main axis 9. After approximately two thirds of its longitudinal extension, the narrow side merges into a front length portion at an angle of approximately 35° relative to the tangent at the angling point, and it runs radially further outwards. However, the curvature of the narrow side also coincides in the front third with the line of curvature of the length portion located behind it. At the front end of the upper narrow side, this merges, thereby forming a small radius, into the lower narrow side of the slot 23 which is first bulged out over approximately one quarter of the longitudinal extension of the slot 23 in the opposite direction to the curvature of the opposite length portion of the upper narrow side.

At the same time, the bulge has a somewhat smaller radius of curvature than the opposite upper narrow side of the slot 23. Subsequently, the lower narrow side has a downward directed arcuate depression which is located centrally opposite the angling point of the upper narrow side. At the same time, the curvature of the arcuate depression corresponds to a segment of an arc of a circle which is also present in a rear region of transition of the upper narrow side into the lower narrow side of the slot 23. Finally, the last length portion of the lower narrow side runs first radially downwards and, after approximately half its length, upwards, with a bend of approximately 90°, to the transitional region which it adjoins.

Arranged in the slot 23 is the control slide 38 which, in the form of disc body, has the same thickness as the drive member 21. The control slide 38 possesses an elliptic circumferential contour with radii of curvature of differing size at the two vertices of the ellipse. The control slide 38 is mounted on the carrier bolt 22 rotatably about a mid-point of the larger radius of curvature, the radius of curvature being coordinated with the circular-arc contour of the rear transitional region of the slot 23. In contrast, the front region of transition of the upper narrow side of the slot 23 into the lower narrow side is coordinated with the radius of curvature of the smaller vertex of the ellipse. Finally, the radius of curvature on the circumference of the control slide 38 between the vertices of the ellipse corresponds to the radius of curvature of the upper narrow side of the slot 23.

The catch hook 39 is mounted rotatably on the carrier bolt 22 next to the control slide 38 and is connected fixedly in terms of rotation to the control slide 38. At the same time, it is located between the drive member 21 and the auxiliary section 16, on which it is supported axially. As seen from the side, the catch hook 39, starting from its mounted end, first extends forwards with a curvature following the upper narrow side of the slot 23, approximately over half the longitudinal extension of the latter, after which it merges into a downwardly angled engaging end region. The engaging narrow side of the end region of the catch hook 39 is bent in a circular path about the geometrical axis of the carrier bolt 22. Arranged in the pivoting plane of the catch hook 39, immediately below the pivoting path of the carrier bolt 22, is the retaining nose 40 which projects from a retaining flange 50 fastened to the bracket.

The retaining nose 40 has an upward-directed circumferential contour which lies on a circular path about the main axis 9. This circumferential contour merges at the front into a length portion which is set back downwards in a sharp bend of the catch hook 39, with the result that the mutually corresponding contact surfaces engaging behind or to engage behind are on the same circular path which is matched to the engaging pivoting length of the catch hook 39. Furthermore, the retaining nose 40 is positioned in such a way that the catching advance of the catch hook 39 can start only when the erected end position of the main strut 8 has been assumed.

Opposite the catch hook 39, the eccentric cam 41 likewise mounted rotatably on the carrier bolt 22 is connected firmly to the control slide 38. The eccentric cam 41 is thus located between the broad side of the drive member 21 and the top column 7, and it is supported axially on the latter. As a result of the indirect axial support of the control slide 38 via the catch hook 39 and via the eccentric cam 41, the latter is secured axially in the slot 23. The eccentric cam 41, likewise designed as disc body, is in the form of a segment of a circle, thereby producing two virtually straight narrow-side portions directed towards one another in a wedge-shaped manner and two curved narrow-side portions which lie on radii about the geometrical axis of the carrier bolt 22.

At the same time, the straight narrow-side portions form an angle of approximately 45° and the eccentric cam 41 is mounted at the vertex. The eccentric cam 41 is connected to the control slide 38 in a rotary position, in which its virtually straight narrow-side portion facing upwards is at the same height as the upward-facing circumferential surface of the control slide 38 and the upper edge of the catch hook 39.

Mounted pivotably on the axle pin 17 in the pivoting plane of the eccentric cam 41 is the detent rod 42 which is movable independently of the top column 7. The detent rod 42 consists of a two-armed lever, the lever arms extending respectively upwards and downwards oppositely to one another in relation to the axle pin 17. A front edge of the upper lever arm of the detent rod 42 facing the eccentric cam 41 extends straight upwards and terminates level with the circumferential contour of the retaining nose 40. The adjoining end edge of the upper lever arm of the detent rod 42 is curved according to the circumferential contour of the retaining nose 40 and is therefore on a circular-arc line about the main axis 9. The downward directed lever arm of the detent rod 42 widens increasingly downwards to a lower end edge, its length corresponding approximately to half the length of the upper lever arm.

The lower end edge of the detent rod 42 has a curved shape with a radius corresponding to its distance from the main axis 9. On the outside of the detent rod 42, there projects from its lower broad side a bearing bolt 51, on which is mounted a front end of the detent pawl 43 which is thus movable in a swinging plane parallel to the broad side of the detent rod 42. The detent pawl 43 is made sickle-shaped, the basic contour of its outer circumference being paralleled to the lower end edge of the detent rod 42. Assigned to the detent pawl 43 and located in its swinging plane is the supporting flange 45 which is fastened to the bracket 6.

The supporting flange 45 is formed from a rectangular plate which, in its installation position, is so arranged that its rear edge is essentially vertically below the axle pin 17, whilst its upper edge extends horizontally in the longitudinal direction of the vehicle and somewhat above the axle pin 17. A rear upper corner region is removed from this rectangular plate, the basic severing cut being made along a circular path about the main axis 9. At the same time, the radius of the basic severing cut is selected so that its arcuate end edge is located opposite to and at a short distance from the basic contour of the outer circumference of the detent pawl 43.

To allow the pivoting of the detent rod 42 to be blocked by means of the detent pawl 43, a detent nose 44 is formed on the outer circumference of the detent pawl 43, in the region near the free end of the latter. As seen in the longitudinal direction of the detent pawl 43, the detent nose 44 has a trapezoidal form which interacts with a matching detent recess 46. This detent recess 46 is cut out from the supporting flange 45 in the lower end region of the arcuate end edge, thereby providing a support fixed relative to the vehicle body.

Since the two short narrow sides of the detent nose 44 are directed towards one another in a wedge-shaped manner, no blocking of the pivoting of the detent rod 42 is possible via the positive engagement of the detent nose 44 into the detent recess 46 alone since, during relative movements of the detent nose 44 in relation to the detent recess 46, the detent pawl 43 would automatically be pivoted in an anti-clockwise direction over the corresponding sloping faces, with the result that the positive connection would be broken again.

In order to secure a positive connection of the detent nose 44 with the detent recess 46 when the main strut 8 is erected, the detent pawl 43 itself must be blocked in its swung-out position in pivoting terms. For this purpose, one end of the control rod 47, fixed to the top column 7, interacts with a control edge 49 on an inner circumference of the detent pawl 43. Advantageously, an end of the top column 7 projecting downwards beyond the axle pin 17 can be utilized as a control rod 47 when the top column 7 is in the pivoting plane of the detent pawl 43.

The end of the control rod 47 is equipped with a control cam 48 which is matched to the control edge 49. This control cam 48, starting from the front narrow side of the control rod 47, first extends, at a radius of curvature somewhat smaller than the radius of the inner circumference of the detent pawl 43, approximately as far as the center of the breadth extension of the control rod 47 and then merges into a radially extending stop edge which is at an angle of about 90° relative to the tangent to the nearest point of curvature. The stop edge has adjoining it an arcuate portion which lies on a circular path about the main axis 9 and which merges into the rear narrow side of the detent rod 42 via an edge terminating obliquely upwards.

The control edge 49, on the inner circumference of the detent pawl 43, possesses over half the pivoting length of the latter, on its stop side, a curvature in the form of an arc of a circle, the radius of which corresponds approximately to that of the distance between the main axis 9 and the bearing bolt 51. Adjoining this curved length portion of the control edge 49 is a trapezoidally recessed zone which, in terms of its clear dimensions, is matched to the radially projecting zone of the control cam 48 from the stop edge to the terminating edge. Finally, the control edge 49 ends in a length portion which lies on a circular path about the main axis 9, the radius of this circular path corresponding exactly to the distance between the geometrical axis of the bearing bolt 51 and the main axis 9. Because of this design, the detent pawl 43 together with its detent nose 44 can be swung out of the associated detent recess 46 only when, between the control rod 47 and the detent rod 42, there is a position in which the control cam 48 engages positively into the control-edge profile 49.

So that, when the main strut 8 is folded back into its released position, the detent rod 42 participates in the return pivoting movement of the latter, above the axle pin 17 there is a carrier lug 52 which is formed on the front edge of the top column 7 and which, directed inwards, is angled into the pivoting plane of the detent rod 42.

As a result of the constructional elements described, with the folding top 2 closed, the lever mechanisms assume a position evident from FIGS. 2 to 5. Thus, the catch hook 39 of each lever mechanism engages positively round the associated retaining nose 40, with the result that the top column 7 is also retained because of the articulation of the catch hook 39 on the carrier bolt 22. The piston rods 34 of the hydraulic cylinders are extended to the maximum extent, the drive members 21 on the axle pin 17 thereby being pivoted into their front end position. Because of this, the control slides 38, in their rear end position, are located in the clear cross-section of the slots 23, and the roof-skin retaining bow 13 rests on the top-box lid 5. Since the control slides 38 are connected fixedly in terms of rotation to the associated catch hook 39 and rest with their upward-facing flank against the opposite narrow side of the slot 23, the catch hooks 39 are blocked completely in pivoting terms via the control slides 38.

Below the carrier bolts 22, the detent rods 42, likewise blocked in pivoting terms, rest with an upper end region of their front edge against the associated eccentric cam 41 immediately behind the downward-facing narrow side of the latter. They are blocked in pivoting terms because the detent pawls 43 are fixed in their deflected position, in which their detent nose 44 engages positively into the corresponding detent recess 46. Thus, the detent pawls 43 are interlocked with the supporting flange 45 via the control cams 48 of the control rods 47 which are shifted into a rear end position opposite the control edges 49 of the detent pawls 43.

To open the folding top 2, fastenings (not shown) securing the roof-skin retaining bow 13 in its position resting on the top-box lid 5 must first be released. The hydraulic cylinders can then be actuated, with the result that the piston rods 34 are retracted into the working cylinder. Because the piston rods 34 are articulated on the associated drive member 21, the two drive members 21 are pivoted synchronously about the main axis 9 in the clockwise direction, a relative movement of the slots 23 in relation to the control slides 38 guided in slots 23 taking place.

Thus, the control slides 38 slide along on the upper narrow side of the associated slots 23, their rotational support on the narrow side of the slot 23 initially being maintained. As a result of this, the lock of the top columns 7 via the catch hooks 39 and the lock of the detent rods 42 means of their supporting flange 45 are also maintained. On the contrary, in this phase, the driving movement of the drive members 21 is transmitted, via the intermediate links 33, to the additional lever 31 and consequently to the levers 24 which are connected fixedly in terms of rotation to them and which thereby swing forwards in the opposite direction to the drive members 21 about the bearing shaft 26.

Via the rotary sliding joints (not shown) of the levers 24 on the side legs of the roof-skin retaining bow 13, the latter is pivoted upwards about the axis of articulation of the links 35, which are aligned with the axis of the bearing shaft 26 and which is fixed via the connecting rods 36, until it has reached its erected intermediate position visible in FIG. 1. When this intermediate position of the roof-skin retaining bow 13 has been reached, front top fastenings, by means of which the roof cover is secured to the upper frame of the windscreen, have to be released. This operation can be carried out manually or take place automatically. At the same time, the top-box lid 5 can be swung up rearwards into its opened position, and this is possible likewise manually or automatically by means of a controllable motor drive.

Figure 6:
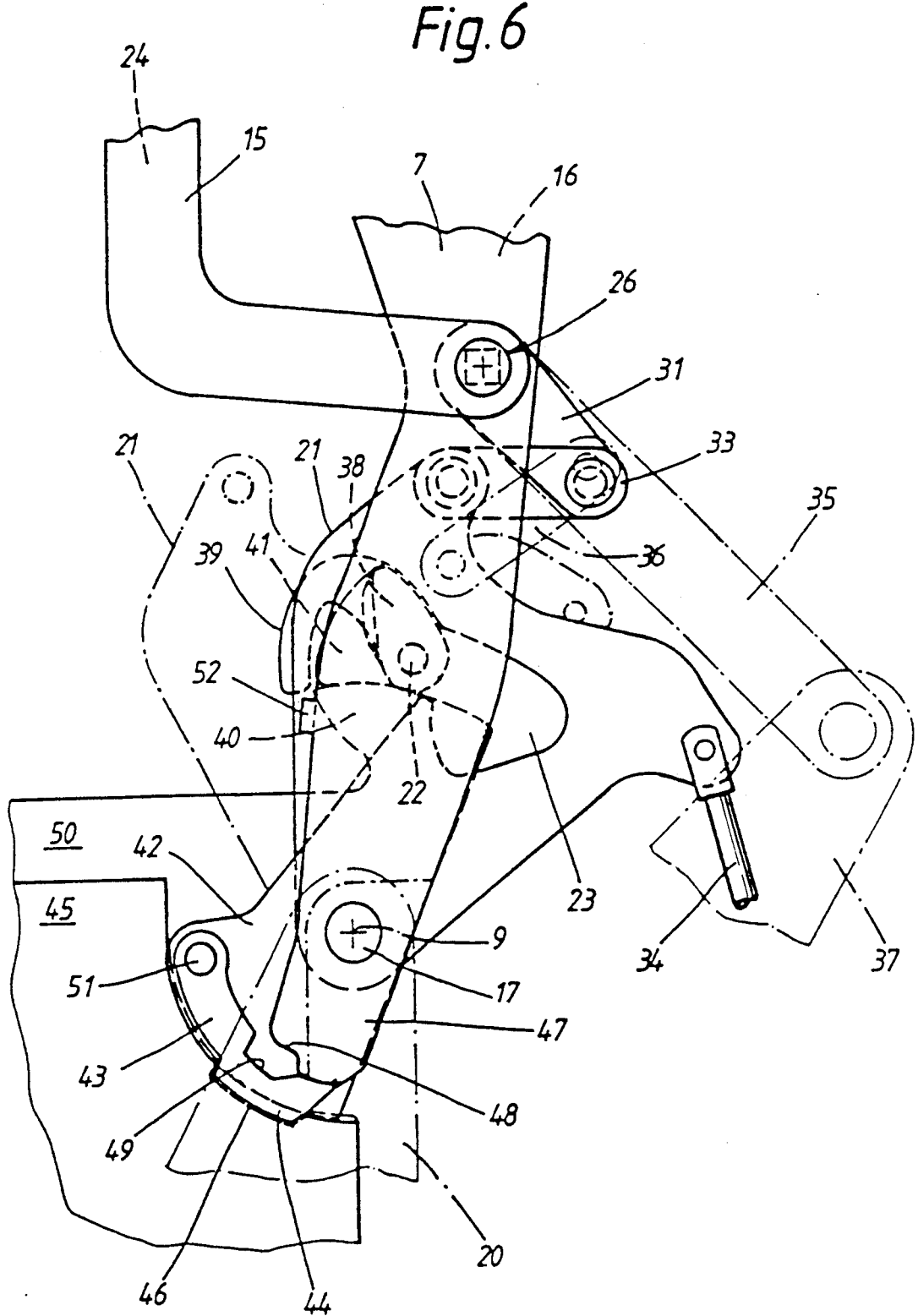
FIG. 6 shows a side view according to FIG. 2, with the roof-skin retaining bow locked.
Figure 7:
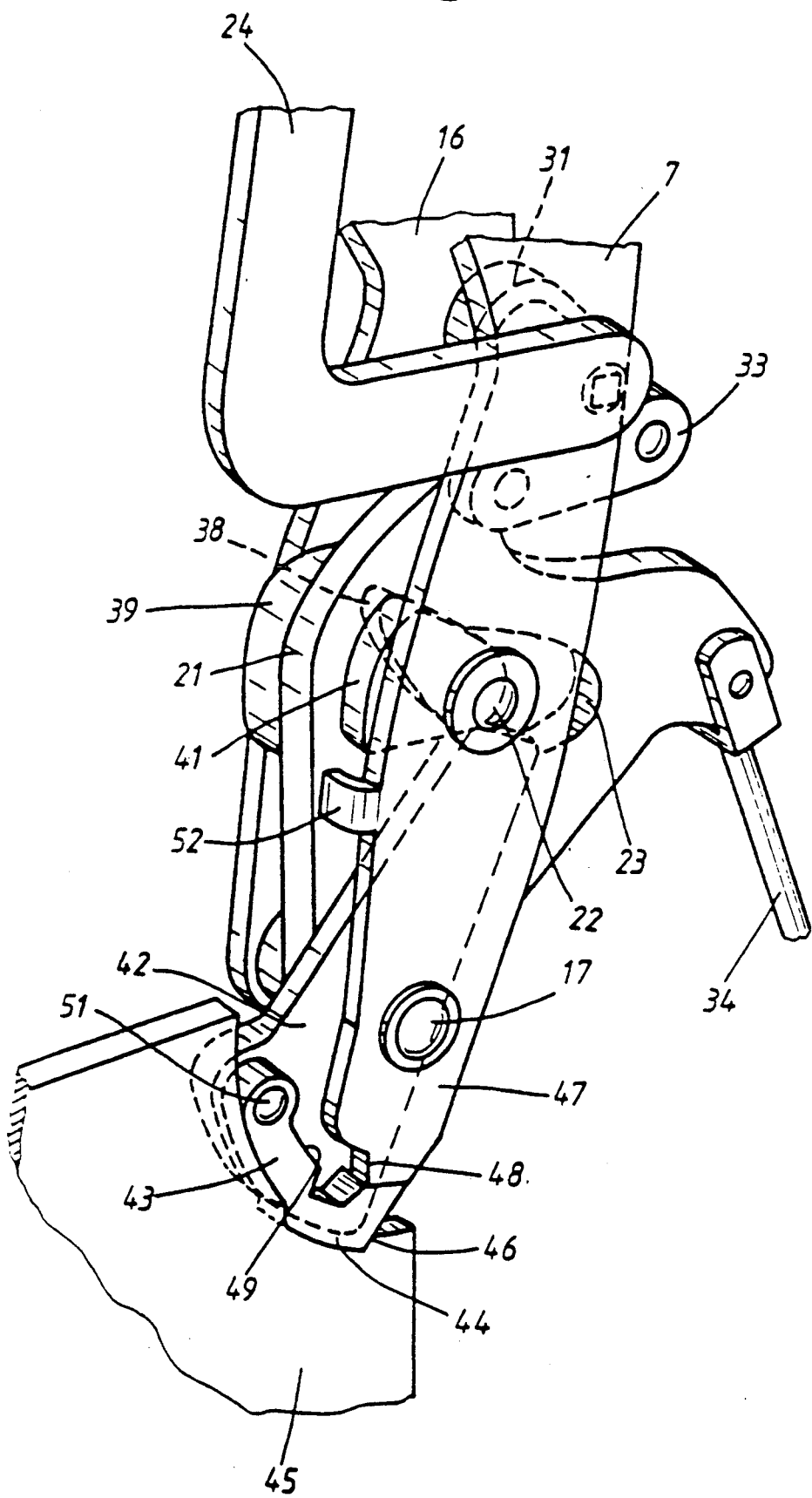
FIG. 7 shows a view according to FIG. 4, with the roof-skin retaining bow locked.
Figure 8:
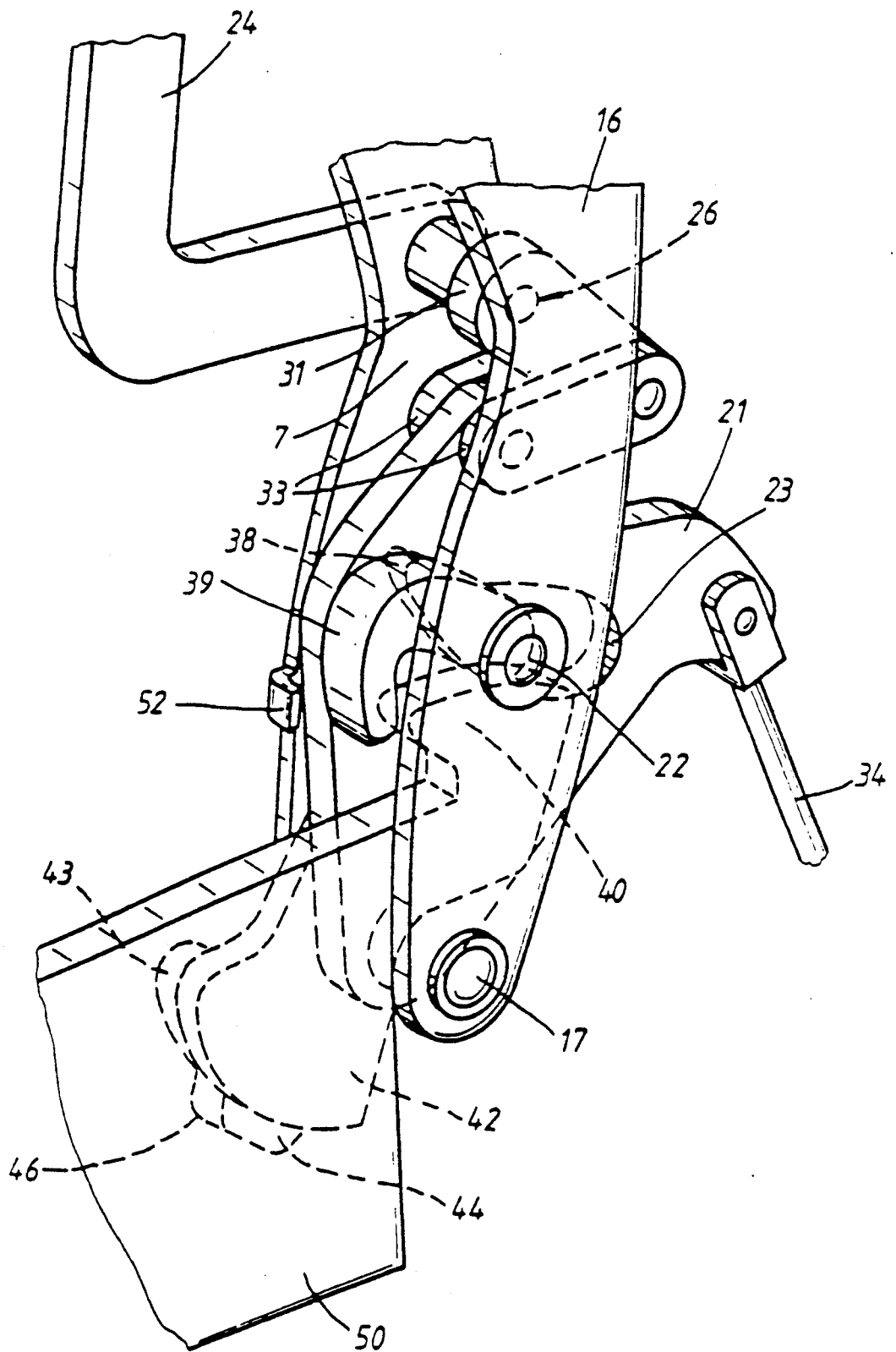
FIG. 8 shows a view corresponding to FIG. 4, with the roof-skin retaining bow locked.

As regards automatic actuation, the drive can be controlled via limit switches, by means of which the erected intermediate position of the roof-skin retaining bow 13 is sensed. When the intermediate position of the roof-skin retaining bow 13 has been reached, the control slides 38 have assumed, in their associated slots 23, the front end position in which they are rotated upwards in the clockwise direction. The partial angle of rotation covered thereby is coordinated with the engaging height overlap of the catch hooks 39 in such a way that these are lifted with their free end to the level of the upper edge of the retaining nosed 40. This position of the lever mechanisms can be seen from FIGS. 6, 7 and 8.

So that the catch hooks 39 remain unhooked during the further pivoting of the drive members 21, and at the same time so that the levers 24 participate in the return pivoting movement of the main strut 8 in a constant position relative to the latter, the control slides 38 are blocked in rotation terms at their front end position in the slots 23, and via the carrier bolts 22 they serve at the same time to couple the top columns 7 to the associated drive member 21. This rotational blocking takes effect initially because the rounded free ends of the catch hooks 39 slide onto the associated retaining noses 40 and are kept in their angular position on the circular path of the retaining nose 40 formed by the upper edge.

In a first phase of the return pivoting movement of the drive members 21, in which the top columns 7 participate, there is a relative movement between the top columns 7 and the detent rods 42, by means of which the rotational blocking by means of the catch hooks 39 is separated from a rotational blocking of the control slides 38 via the detent rods 42. After a relative pivoting angle of the top columns 7 in relation to the detent rods 42 of approximately 35°, the detent rods 42 initially blocked in pivoting terms as a result of the engagement of the detent pawls 43 into the supporting flange 45 pass into a position in which the control rods 47 fixed to the top columns 7 are located, ready for engagement, with their control cam 48 opposite the control edges 49.

At the same time, the upper end edge of the detent rods 42 has shifted forwards relative to the eccentric cam 41, the end edges now resting over their surface against the downward-facing narrow side of the eccentric cams 41. As soon as the control rods 42 have reached their front end position, they are taken up by the top columns 7 via the carrier lugs 52, with the result that a torque of the detent rods 42 about the axle pin 17 relative to the supporting flange 45 occurs. As a result of this torque, the forward-facing sloping faces of the detent noses 44 run onto the corresponding sloping faces of the associated detent recess 46, with the result that the detent pawls 43 receive a pivoting pulse in the anti-clockwise direction.

The interlock of the detent rods 42 with the supporting flanger 45 is cancelled as a result of the pivoting pulse. At the same time, an interlock of the detent rods 42 with the control rods 47 is obtained via the positive connection between the control cams 48 and the control edges 49, so that the detent rods 42 are kept fixed to the top columns 7. As a result of this locking advance, the detent noses 44 are lifted completely out of their detent recess 46 and are thereafter kept in their locking position, with the detent noses 44 being supported on the arcuate end edge of the supporting flanges 45 which is associated with them.

Figure 9:
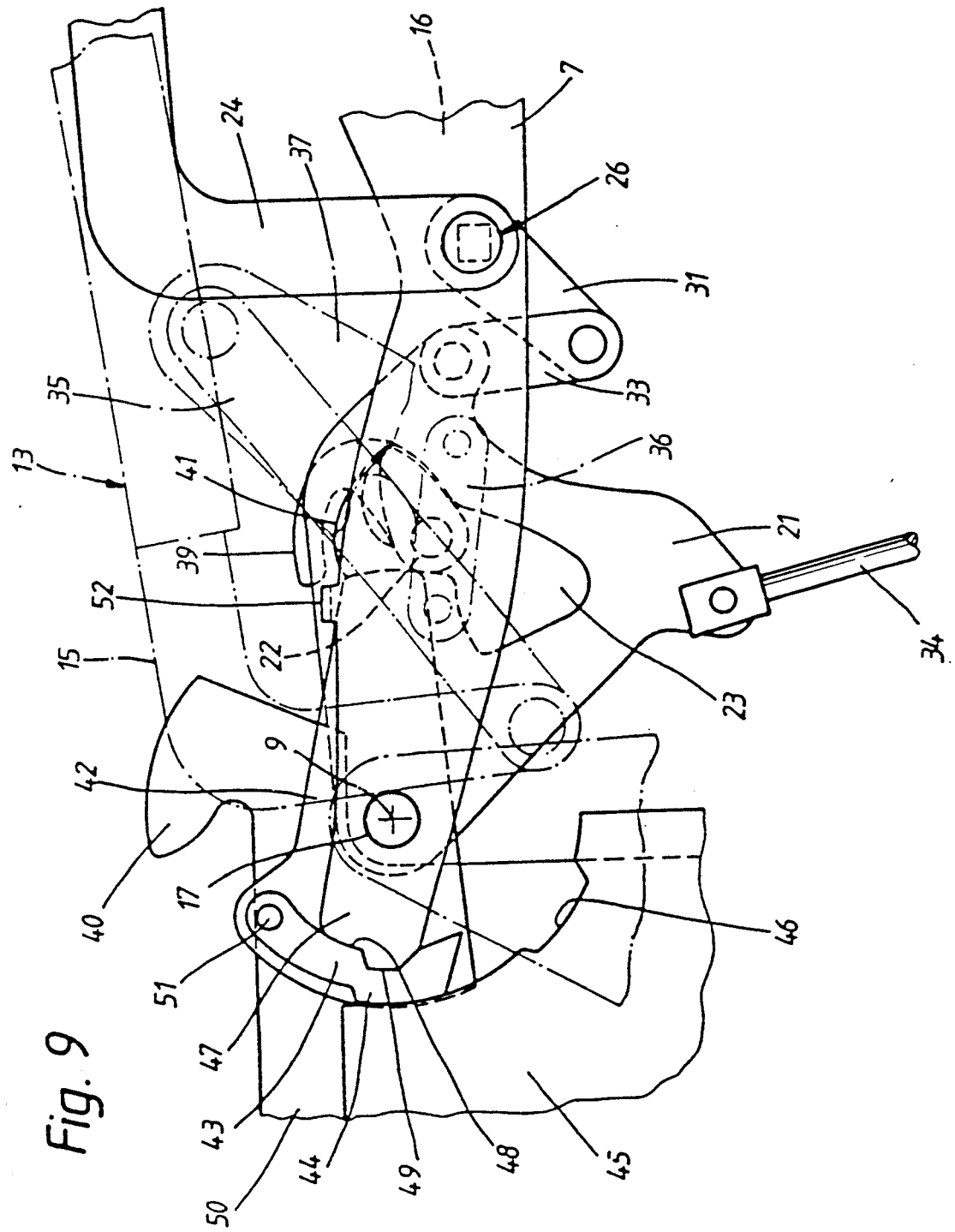
FIG. 9 shows a side view according to FIG. 2, with the folding top retracted.
Figure 10:
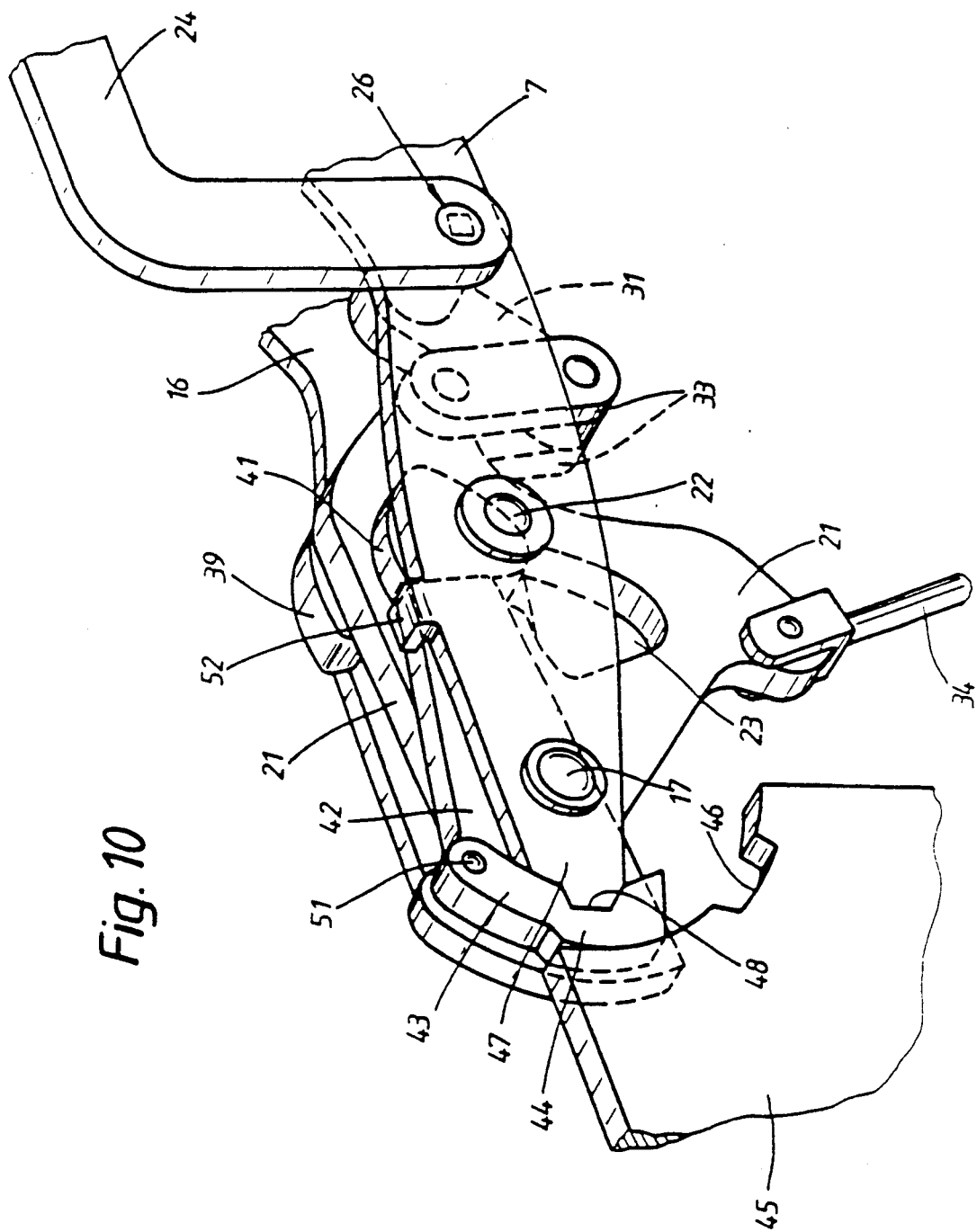
FIG. 10 shows a view according to FIG. 4, with the folding top retracted.
Figure 11:
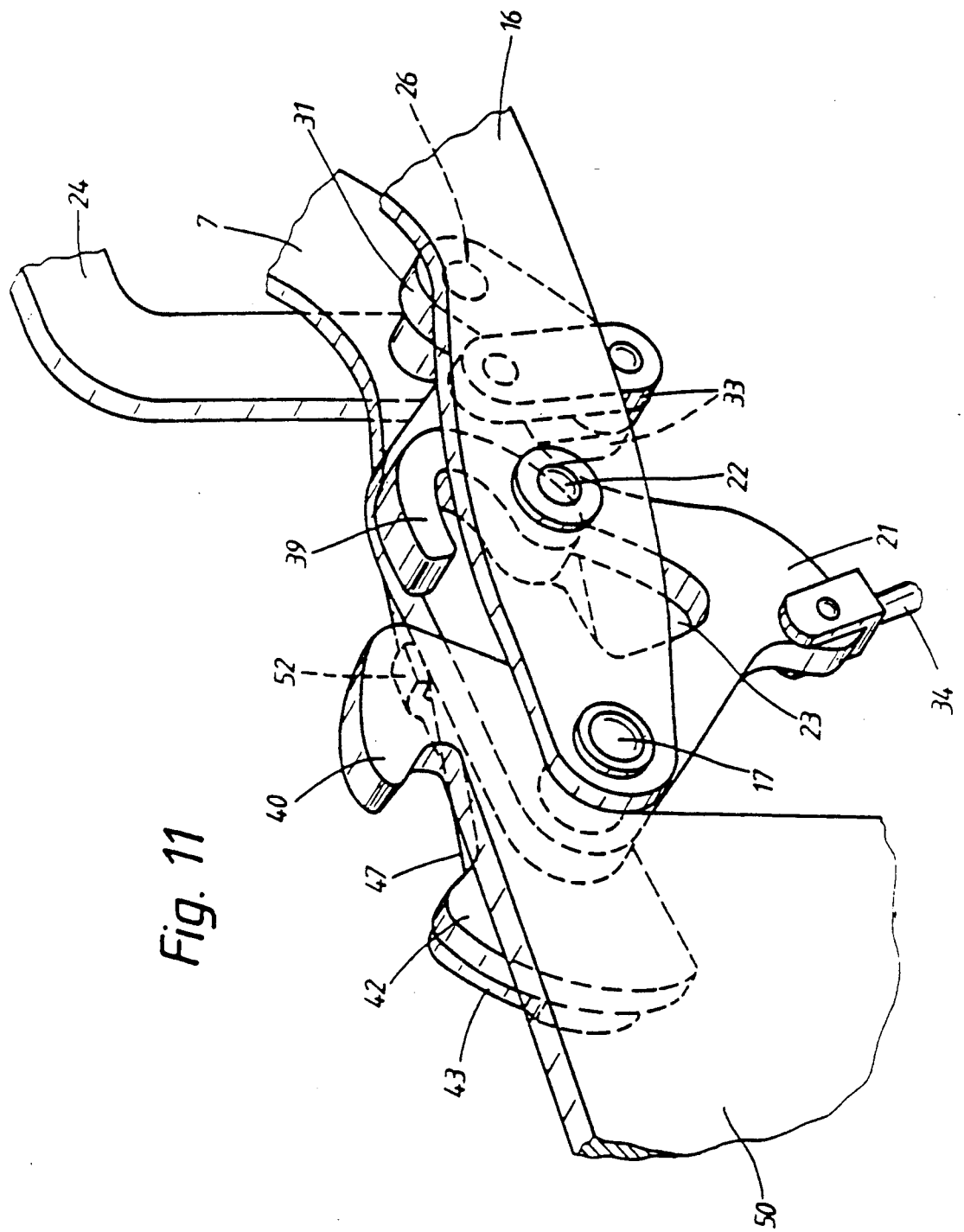
FIG. 11 shows an inside view relating to FIG. 5, with the folding top retracted.

The main strut 8 and consequently the entire top rod assembly positively controlled as a function of its pivoting angle can now be folded back into its stowed position evident from FIGS. 9 to 11, because the piston rods 34 are retracted into their end position in the working cylinders.

The control and locking mechanisms remain in their assumed position in this last lowering phase.

With the folding top 2 retracted completely, the top-box lid 5 can be swung to and be locked fixedly to the vehicle body by means of fastenings (not shown).

When the retracted folding top is to be closed again, after the top-box lid 5 has been opened the piston rods 34 are extended again, the drive members 21 being pivoted forwards about the main axis 9 in the anti-clockwise direction. Since the control slides 38 are blocked in rotational terms in the front end position of the slot 23, they do not allow any advancing movement of the slots 23 in relation to the control slides 38, with the result that the main strut 8 participates synchronously in the pivoting movement of the drive members 21. The pivoting blocking of the control slides 38 via the eccentric cams 41, which is obtained by means of the associated detent rod 42 interlocked with the control rod 47, is maintained over a pivoting angle of the main strut 8 of virtually 90°.

At the same time, the folding top 2 together with the roof-skin retaining bow 13, which is taken up via the rotary sliding joint of the levers 24, moves out of the top box 3 and is increasingly unfolded. The levers 24 remain interlocked fixedly with the top columns 7 via the control slides 38. During the erecting movement of the main strut 8, the catch hooks 39, still blocked via the detent rods 42, also slide onto the upper edge of the retaining noses 40, so that in the meantime there is a double rotational blocking of the control slides 38.

Shortly before the main strut 8 has reached its erected end position, the free end face of the detent pawls 43 runs onto the associated rear sloping face of the detent recesses 46. The detent rods 42 are thereby stopped, whilst the top columns 7 and therefore also the control rods 47 move further. Since the control cams 48 at the same time slide along on the control edges 49, the detent pawls 43 are deflected about the bearing bolts 51 via corresponding sloping faces, the detent noses 44 being pressed into the associated detent recess 46.

After this relative movement between the control rods 47 and the detent rods 42 has concluded, the detent pawls 43 interact positively with their supporting flange 45 and are locked as a result of the conversion of a relative pivoting movement of the control rods 47 in relation to the detent rods 42 into a clamping advance on the inner circumference of the detent pawl 43. In the course of this relative movement between the control rods 47 and the detent rods 42, the end edges of the detent rods 42 slide rearwards along the downward-facing narrow side of the eccentric cams 41, until they no longer offer rotational support for their eccentric cams 41. The control slides 38 are now blocked in rotational terms only via the catch hooks 39. This rotational blocking is cancelled only when the main strut 8 has once again reached its erected end position according to FIGS. 6 to 8.

During the actuation of the top, the driving movement of the drive member 21 must be interrupted briefly in this position, since the folding top 2 is already closed in the region in front of the main strut 8. The front roof fastenings above the windscreen can therefore now be transferred into their closing position and the top-box lid 5 swung to. The two actuations are possible automatically by the control of servomotors by means of limit switches. The driving movement of the drive members 21 can thereafter be continued in the same direction, the slots 23 being shifted forwards in relation to the control slides 38. The control slides 38 and with them the catch hooks 39 are thereby rotated in the anti-clockwise direction. As soon as the catch hooks 39 have engaged behind their retaining nose 40 even with only a minimum height overlap, there is already a firm locking of the top columns 7 in their erected end position.

The uncoupling of the top columns 7 from the driving movement of the drive members 21 is initiated at the same time, since it takes place together with the return rotation of the control slides 38. However, this uncoupling is carried out completely only when the catch hooks 39 have concluded their catching advance, since only thereafter does a circumferential surface of the control slides 38 extend parallel to the upper narrow side of the slot 23 in the rear longitudinal region of the latter. The drive members 21 are now uncoupled from the top columns 7. The same applies to the levers 24 which can thus be driven in the opposite direction to the drive members 21 via the additional levers 31 and the intermediate links 33, by being pivoted about the bearing shaft 26 held at a fixed location.

After the drive members 21 have reached their front end position, the roof-skin retaining bow 13 is lowered onto the closed top-box lid 5 by means of the pivoting drive via the levers 24, with the result that the lever mechanisms once again assume the position evident from FIGS. 2 to 5. After the locking of the roof-skin retaining bow 13 with the body of the motor vehicle 1, the folding top 2 is completely closed.

The above-described mechanical sequence control of the lever mechanisms located on the folding top is characterized, because of the multiple functions of the control slides 38, by a design which is simple per se and which therefore saves material. Furthermore, in order to reduce the actuating forces to a minimum, the lever mechanisms are made as efficient as possible in terms of frictional forces which arise. This is also assisted by deliberately doing without spring-loaded mechanisms.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A folding top for vehicles comprising a common pivoting drive of a main strut and of a roof-skin retaining bow of a supporting top rod assembly via mechanical drive members for transferring the folding top between a stowed position retracted into a top box of the vehicle and a closed position of folding top at which the roof-skin retaining bow rests on a top box lid covering the top box of the vehicle, an automatically controlled lock of the main strut relative to a vehicle body at an erected end position of the main strut which is operatively associated with an uncoupling of the main strut from driving movement of the drive members, and means operatively arranged in relation to top columns of the main strut for locking the main strut fixedly to the vehicle body, such that a catching advance starts at an erected end position of the main strut, and an uncoupling of the top columns from the driving movement of the drive members is activated via the catching advance of the locking means at the fixed locking of the main strut to the vehicle body, wherein the locking means includes a catch hook which is operatively articulated on each of the top columns and operatively interacts with a retaining nose fixed to the vehicle body.

2. A folding top according to claim 1, wherein contact surfaces between the catch hook and the corresponding retaining nose are on a circular path which is coordinated with an engaging round pivoting length of the catch hook.

3. A folding top according to claim 1, wherein a pivoting plane of the catch hook is parallel to a pivoting plane of an associated top column and of an associated drive member.

4. A folding top according to claim 3, wherein the catch hook is arranged next to a side of the drive member which is broader than another side, a slot is cut out from the drive member so that a carrier bolt of the catch hook passes therethrough, and a control slide rotationally fixed to the catch hook rides in the slot.

5. A folding top according to claim 4, wherein the control slide has a substantially ovoid circumferential contour.

6. A folding top according to claim 4, wherein the slot and the control slide are coordinated with one another in such a way that, with the main strut erected, in the course of a relative movement of the drive member in relation to the top column for a closing of the folding top, the catch hook is positively pressed into and held in a locking position thereof, and wherein, during a reversal of a direction of movement of the drive member, the catch hook is positively transferred into an unhooked position thereof after the roof-skin retaining bow has reached a position intermediate the stowed position and the closed position during respective opening and closing of the folding top.

7. A folding top according to claim 6, wherein the catch hook, in the unhooked position, is blocked in pivoting terms by means of a detent mechanism, by which a pivoting position of the top column is sensed.

8. A folding top according to claim 7, wherein the catch hook is connected fixedly in terms of rotation to an eccentric cam which, when the main strut is not erect, is blocked in rotational terms by means of a detent rod.

9. A folding top according to claim 8, wherein the eccentric cam has a circular segment.

10. A folding top according to claim 8, wherein the eccentric cam is arranged, opposite the catch hook, on an adjacent broad side of the drive member, and wherein the eccentric cam interacts circumferentially with an end edge of the detent rod.

11. A folding top according to claim 10, wherein the detent rod, the drive member and the top column have a common pivot axis, and wherein the detent rod projects at both ends thereof beyond the common pivot axis.

12. A folding top according to claim 11, wherein a detent pawl is mounted movably on an end region of the detent rod remote from the end edge thereof, and wherein, via a relative movement of the top column in relation to the detent rod, the detent pawl can be transferred into a blocking position fixed relative to the vehicle body.

13. A folding top according to claim 12, wherein the detent pawl is on a broad side of the detent rod, the circumferential contour of the detent pawl moves about a circular arc line about the common pivot axis, wherein located opposite to and at a radial distance from a circumferential contour of the detent pawl is an inner circumferential contour of a supporting flange fixed to the vehicle body, and between the circumferential contour and the adjacent inner circumferential contour there are a detent nose and a corresponding detent recess which, in an erected end position of the detent rod, are connected positively to one another as a result of movement of the detent pawl.

14. A folding top according to claim 13, wherein erecting movement of the detent rod is limited by the run of a free end of the detent pawl onto a stop face of the detent recess.

15. A folding top according to claim 13, wherein arranged in a pivoting plane of the detent pawl is a control rod which is integral with the top column and having a front end which is configured as a control cam, wherein the control cam rests against a control edge on an inner circumference of the detent pawl, and the control cam and control edge are coordinated with one another in such a way that, after the conclusion of an erecting movement of the detent rod, the detent pawl is moved into a detent position thereof via a radial step of the control cam and, during the further pivoting of the top column into an erected end position thereof, is held in the detent position.

16. Folding top according to claim 15, wherein the control rod is formed on the top column as an extension thereof.

* * * * *